July 9, 1929. F. N. THIEFELS 1,720,105
CONNECTING ROD AND METHOD OF MAKING
Filed May 16, 1927
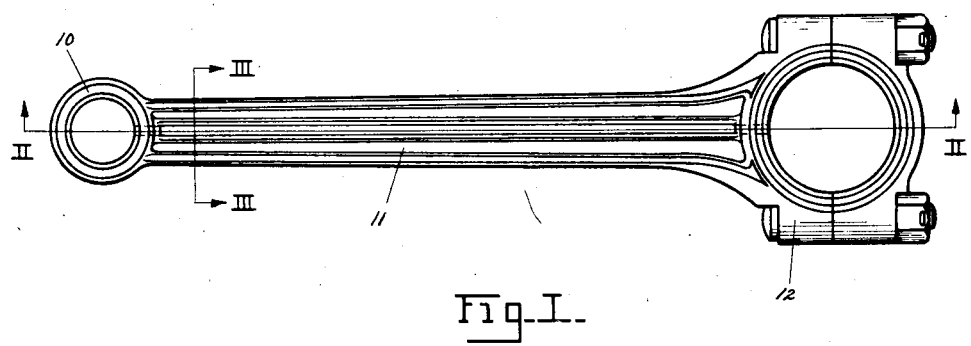
Fig. I.
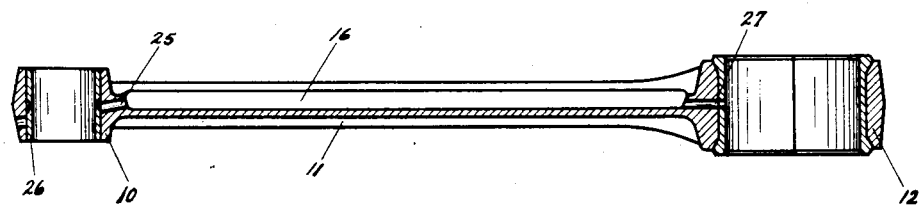
Fig. II.
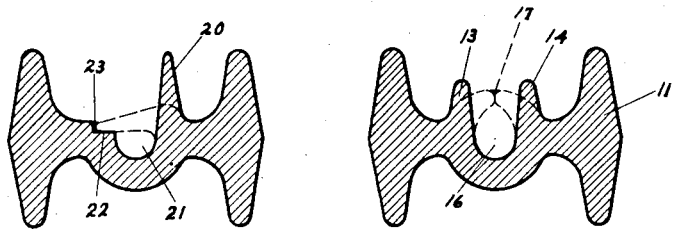
Fig. IV. Fig. III.
INVENTOR.
FERDINAND N THIEFELS
BY Chester H. Braselton
ATTORNEY.

Patented July 9, 1929.

1,720,105

UNITED STATES PATENT OFFICE.

FERDINAND N. THIEFELS, OF PONTIAC, MICHIGAN, ASSIGNOR TO THE WILLYS-OVERLAND COMPANY, OF TOLEDO, OHIO, A CORPORATION OF OHIO.

CONNECTING ROD AND METHOD OF MAKING.

Application filed May 16, 1927. Serial No. 191,604.

My invention relates to the fabrication of metallic articles and particularly to articles formed of metal which is susceptible to manipulation while in a plastic state. Specific embodiments falling within the purview of my invention are mechanical elements which are fabricated by means of a forging operation wherein steel bars that have been heated to a temperature sufficiently high to impart the desired degree of plasticity are subjected to pressure between die blocks thereby causing the metal to assume the contour of the die.

One of the objects of my invention is to provide a method of manipulating forgings whereby a resulting product having closed channels or cavities may be fabricated.

Another object of my invention is to provide a method of fabricating forgings having a hollow or channel portion according to which the forging is provided with flanges the edges of which are subsequently joined to form a closed space therebetween.

Another object of my invention is to provide a method of fabricating metallic elements by which a material saving in subsequent machining operations is realized. It is a further object of the invention to provide a hollow connecting rod which is fabricated by means of forging operations. The invention likewise contemplates a novel method of constructing hollow connecting rods by which the usual drilling operations are reduced materially.

Heretofore in order that metallic elements might be formed with hollow or closed channelled portions, it has been necessary to form the element by casting the same with the aid of cores having the desired contour, or by forming the channel by means of a machining operation. When the element is formed of a metal which does not adapt itself readily to a casting operation, the machining operation alone remains to accomplish the desired result. In either instance the cost is high and frequently prohibitive.

According to the present invention, one is enabled to construct hollow or closed channelled elements by means of forge operations in conjunction with subsequent brazing or welding operations when a sealed channel is required.

A better understanding of the principles of my invention may be had by referring to the drawings and description relative thereto, an embodiment of the invention which may be preferred as it applies to the fabrication of hollow connecting rods for combustion engines.

Figure I is an elevational view of a forged connecting rod illustrating the flanged portions in their position immediately after the forging operation.

Fig. II is a sectional view of the rod illustrated in Fig. I taken along the line II—II.

Fig. III is likewise a sectional view of the rod illustrated in Fig. I taken along the line III—III and also illustrates the relation which the flanged portions assume in their final position; and Fig. IV is likewise a sectional view corresponding to that illustrated in Fig. III of a modified form which my invention may assume.

In applying the principles of my invention to the fabrication of connecting rods, the rod is constructed to include a wrist pin boss 10, a shank 11 and a crank pin boss 12. The shank is of the conventional I-beam cross section but differs in that it is provided with two parallel flanged portions 13 and 14 and may include a recess 16 therebetween, as illustrated. At some time after the original forging operation the flanges are bent toward each other substantially as illustrated at 17, where they are brazed or welded in order to insure a satisfactory seal between the adjoining extremities of the two flanges. In the modification it will be observed that the connecting rod shank as it is formed during the forging operation, includes but a single flange 20, a recess 21 and a shoulder portion 22. In this instance the flange is bent over to contact with the shoulder portion and may be sealed at 23 by brazing or by means of any other well known or approved sealing operation. As an alternative, the flanges may be formed by appropriate milling operations after the initial forging operation.

Oil communication between the resulting sealed channel and the bearing surfaces is realized by drilling a hole therethrough in accord with recognized practice. Thus the hole 25 in the wrist pin boss is drilled at a slight angle to the axis of the pin and penetrates both the upper and lower portions of the boss before a bronze bushing 26 is positioned. A similar communicating passage 27 is provided from the lower end of the channel to the surface adapted to engage a crank pin (not shown), preferably after the conventional babbiting operation. It will be understood, of course, that these communicating passages may be formed at any time subsequent to the original forging operation and although I prefer that the particular step in question be performed after the channel is closed and sealed, the order of sequence is not material to the successful practice of the invention.

The channel forming operation may be performed to advantage while the forging remains hot; and the sealing or brazing may be performed immediately thereafter, and while the forging remains at an elevated temperature. From the description hereinabove set forth, it will be apparent that by practicing the invention one is enabled to manufacture forged rods having closed cavities and channels without resorting to extensive machining operations. Moreover, the invention provides a novel connecting rod construction which may be fabricated at a cost materially below that at which similar structures have been made prior to this invention.

Although there is described but a single structure to which the principles of the invention may be applied, it will be apparent to those skilled in the art that the invention is not so limited, but is susceptible to many widely different modifications and applications, wherefore, that it be limited only as indicated in the appended claims.

I claim:

1. A method of manufacturing hollow connecting rods including a shank and bearing portions on the ends thereof that comprises forming a rod with substantially parallel flanged portions along the shank thereof, joining the ends of the flanges and interconnecting the inclosure formed by flanged portions with the bearing portions of the rod.

2. A method of manufacturing hollow connecting rods having a shank and bossed bearing portions at opposite ends thereof, that comprises forming a rod with substantially parallel flanged portions along the shank, joining the ends of the flanges and drilling holes through the bossed portions to interconnect the inclosure formed between the flanged portions with the bearing portions.

3. A connecting rod having a shank and bossed bearing portions integral with the ends thereof, said shank having flanged portions lapped together in sealed relation to form a closed channel, said channel being interconnected with the bearing surfaces by holes drilled through the intervening bossed portion.

In testimony whereof, I affix my signature.

FERDINAND N. THIEFELS.